United States Patent
Ferlitsch (10) Patent No.: US 8,223,361 B2
(45) Date of Patent: Jul. 17, 2012

(54) EMPTY JOB DETECTION FOR DIRECT PRINT

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1145 days.

(21) Appl. No.: 11/548,595

(22) Filed: Oct. 11, 2006

(65) Prior Publication Data

US 2008/0091636 A1    Apr. 17, 2008

(51) Int. Cl.
*G06F 3/12*     (2006.01)
*G06K 15/00*    (2006.01)
*G06K 3/00*     (2006.01)
*G06K 7/00*     (2006.01)
*G06F 19/00*    (2006.01)
*G06F 11/00*    (2006.01)

(52) U.S. Cl. .................... 358/1.15; 358/1.13; 358/1.16; 358/1.17; 358/1.18; 235/379; 400/62

(58) Field of Classification Search .......... 358/1.1–1.18; 1/1; 715/201; 707/100; 235/379
See application file for complete search history.

(56) References Cited

U.S. PATENT DOCUMENTS

| | | | |
|---|---|---|---|
| 4,925,176 A | | 5/1990 | Acquaviva |
| 5,418,949 A | * | 5/1995 | Suzuki .................................. 1/1 |
| 5,574,905 A | * | 11/1996 | deCarmo .............................. 1/1 |
| 6,954,895 B1 | * | 10/2005 | Oak ............................... 715/201 |
| 2002/0059265 A1 | * | 5/2002 | Valorose, III .................. 707/100 |
| 2002/0122189 A1 | | 9/2002 | Salgado |
| 2003/0002056 A1 | * | 1/2003 | Yamaguchi et al. ........... 358/1.2 |
| 2004/0190039 A1 | | 9/2004 | Lay et al. |
| 2005/0190405 A1 | | 9/2005 | Tomita ......................... 358/1.18 |
| 2006/0074838 A1 | * | 4/2006 | Srivastava ......................... 707/1 |
| 2006/0153615 A1 | * | 7/2006 | Kamei ............................ 400/62 |
| 2006/0191998 A1 | * | 8/2006 | Mueller et al. ................. 235/379 |
| 2006/0238777 A1 | * | 10/2006 | Anno et al. .................... 358/1.1 |
| 2007/0024888 A1 | * | 2/2007 | Bailey et al. ................. 358/1.14 |

FOREIGN PATENT DOCUMENTS

| | | |
|---|---|---|
| JP | 06-075962 | 3/1994 |
| JP | 09-149003 | 6/1997 |
| JP | 2004362219 A | 12/2004 |

OTHER PUBLICATIONS

Sharp ARM277 Product Brochure.[online],[retrieved on Sep. 19, 2006] Retrieved from Internet using <URL:http://www.uoesharp.com/pdf/PRODUCTS/SHARP/arM277.pdf>.
Decision of Refusal for Application No. 2007-233673, delivery date Apr. 20, 2010.

* cited by examiner

*Primary Examiner* — Mark K Zimmerman
*Assistant Examiner* — Satwant Singh
(74) *Attorney, Agent, or Firm* — Michael Blaine Brroks, PC; Pejman Yedidsion; Dave Ripma (57) ABSTRACT

The embodiments of the present invention provide for empty object/file detection by classifying an object/file based on a set of classification types, and parsing a portion of the object/file to determine whether the object/file is empty.

22 Claims, 8 Drawing Sheets

EMPTY JOB DETECTION FOR DIRECT PRINT

FIELD OF THE INVENTION

The embodiments of the present invention relate to output processing, particularly determining empty outputs submitted to printers.

BACKGROUND

Printers typically provide some feedback if an "error" occurs during print processing. In some situations, for example, a print job that may result with no pages printed or outputted is considered an error regardless of whether the output is a result of a rendering error or is because the print file itself contains no instructions which would result in any meaningful rendered output—e.g., "ink on paper." A way to detect empty print files is desirable, for it may provide more meaningful feedbacks to users, as well as in some situations provide paper savings, for example, eliminate printing of blank separator or trailing pages.

SUMMARY

In one aspect of the invention, a method is provided. The method includes the steps of receiving a file, parsing the file based on one or more classification format types, and detecting for at least one nonempty element indicating that the file is nonempty. The method also includes the step of identifying the file as an empty file if no empty elements are detected within the file. The parsing step and the detecting step are stopped when at least one nonempty element is detected.

In another aspect, a device adapted to detect empty objects is provided. The device includes a direct submit utility module and an empty object detection module. The direct submit utility module is adapted to receive a file for processing and to transmit the file to an output image/rendering device. The empty object detection module is adapted to parse the file received by the direct submit utility module based on one or more classification format types, detect for at least one nonempty element indicating that the file is nonempty, and if no nonempty elements are detected within the file, identify the file as an empty file. The parsing and the detection for the at least one nonempty element are stopped when at least one nonempty element is detected.

In another aspect, a system is provided which includes a first device adapted to detect empty objects and an output image/rendering device operably coupled to the first device. The first device includes a direct submit utility module and an empty object detection module. The direct submit utility module is adapted to receive a file for processing and transmit the file to an output image/rendering device. The empty object detection module is adapted to parse the file received by the direct submit utility module based on one or more classification format types, detect for at least one nonempty element adapted to indicate that the file is nonempty, and if no nonempty elements are detected within the file, identify the file as an empty file. The parsing and the detection for the at least one nonempty element are stopped when at least one nonempty element is detected. The output image/rendering device, on the other hand, is adapted to receive the file for rendering.

BRIEF DESCRIPTION OF THE DRAWINGS

The present invention is illustrated by way of example and not limitation in the figures of the accompanying drawings, and in which.

DETAILED DESCRIPTION

Figure 1:
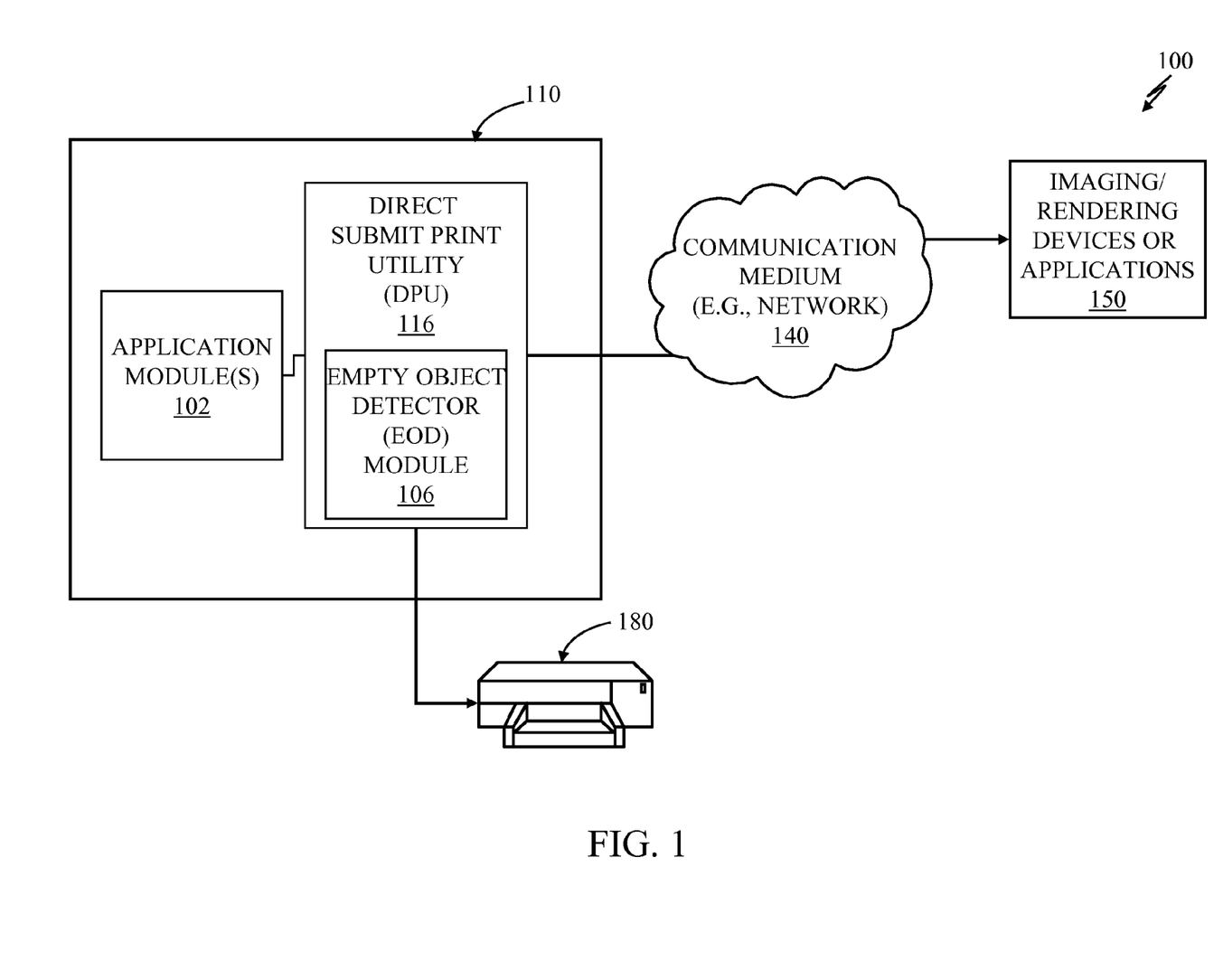
FIG. 1 is a high-level block diagram of an exemplary system according to an embodiment of the invention.
Figure 2:
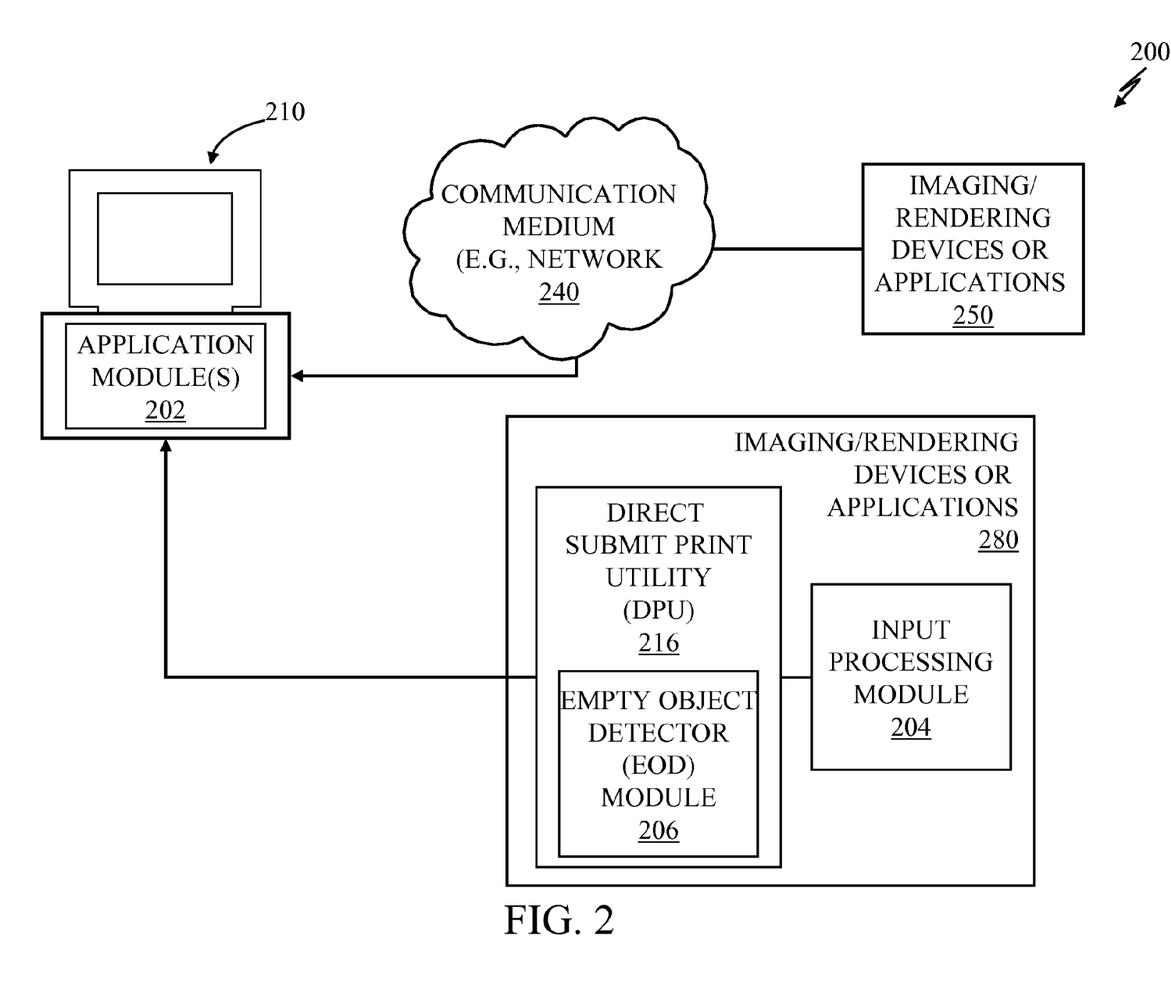
FIG. 2 is a high-level block diagram of another exemplary system according to an embodiment of the invention.

To better understand the figures, reference numerals within the one hundred series, for example, 106 and 116, are initially introduced in FIG. 1, reference numerals in the two hundred series, for example, 206 and 216, are initially introduced in FIG. 2, and so on and so forth. So, reference numerals in the nine hundred series, e.g., 916 and 924, are initially introduced in FIG. 9.

The embodiments of the invention relate to enhancing reliability of printing systems, in particular, detecting empty input objects that may be submitted for printing. In some embodiments, an empty input object is defined as an input object that when processed typically does not produce a meaningful or desirable, e.g., "ink on paper," rendered output to the user. In some embodiments, an empty object detection process is performed on these input objects, which typically includes classifying the input objects by format type and parsing such objects to determine if these input objects are empty. The parsing process in general is adapted to detect for nonempty elements, e.g., any element—such as, but not limited to, drawing regions, vector graphic instructions, graphic commands, rendering commands, character sequence, and texts—indicating that an output is to be rendered, e.g., an output rendered as "ink on paper" or based on a defined condition, and if any of such nonempty element is detected to stop the parsing process. If no nonempty elements, however, are detected, the object/file is identified as an empty object/file, i.e., if submitted to an imaging/rendering device may result in having no rendered output, e.g., no ink on paper, rendered. In some embodiments, the parsing algorithm parses particular nonempty element indicator locations, e.g., page tables, image headers, boundaries, drawing regions, page entries, and partitions, which may contain nonempty elements or references to nonempty elements. Based on the empty object detection algorithms of the present invention, more meaningful feedbacks may be provided, such as being able to distinguish whether a no-output print job is due, for example, to rendering errors or due to the submitted input object being empty. Although the embodiments of the present invention are discussed in relation to printing, these embodiments may also apply to other systems that may benefit in the empty detection features of the present invention, e.g., fax transmission, document filing, etc. The discussion of printing systems is herein for illustrative purposes, but is not intended to limit the scope of the invention.

FIG. 1 is an exemplary system 100 according to an embodiment of the invention. The system 100 typically includes a computing device 110, e.g., a general-purpose computer. In some embodiments, the computing device 110 is directly attached, e.g., via a serial or parallel bus, to one or more imaging and/or rendering devices and/or applications 180, herein also referred to as imaging/rendering devices, such as peripherals, which may include printers, copiers, facsimile machines, and/or to other computing devices. Typically via the computing device, a user is enabled to submit input objects typically via the direct print utility 116, to such peripherals for output, such as printing and/or faxing, for example. The computing device 110 may also be part of a local area network 140, such that the computing device 110 is adapted to communicate with other imaging/rendering devices 150, for example, to print servers, fax servers, other computing devices, network peripherals, and other devices operably coupled to such network 140. This exemplary network 140 may include wired, wireless, or both network segments, which may include broadcast. The computing device 110 may also be operably coupled to a wide area network, not shown, such as the Internet, for example, via the network 140 and an appropriate gateway and/or router device, such as known to those of ordinary skill in the art.

The computing device 110 may include one or more application modules 102 and a direct submit print utility (DPU) module 116, which may incorporate an empty object detector (EOD) module 106. An application module 102 is typically a set of program instructions or application adapted to process, including generate, application objects. Such application objects processed by such application modules may include, for example, image data object, document data object, vector data object, and page description language (PDL) object. These application modules 102 are also typically referred to as software applications. In some embodiments, an application module 102 may include or utilize a device driver, which facilitates the generation of input objects for a specific device or type of device. The application objects are typically embodied as files, which may include streaming files. These application objects may be input objects to the DPU module 116. Examples of such application modules may include MICROSOFT™ (MS) WORD, MS Notepad, MS Wordpad, COREL™ WORDPERFECT™, MS OFFICE EXCEL, COREL™ CORELDRAW, ADOBE™ PHOTOSHOP™, and ADOBE™ ACROBAT™.

Once input objects/files are submitted for printing, for example, via the application modules 102 or via other submission process, the EOD module 106 generally detects if the input objects or files are empty, as defined within the system. The EOD module 106 may also be adapted to process not only input objects/files local to the computing device but also remote input objects. These input objects may have been processed by remote application modules. The DPU module 116 is typically adapted to submit or transmit objects, e.g., print jobs, to imaging/rendering devices 150, 180. By having the EOD module apply the empty object detection process of the present invention, these imaging/rendering devices may function more efficiently. For example, as mentioned above, a printing process may be able to identify whether the no-output result is due to rendering errors or due to an empty file. In another example, if the video data received via broadcast by a digital TV is an empty object as identified by the EOD module, the digital satellite TV may accordingly be informed that the data being sent to the satellite TV is empty or be informed that the video was not transmitted considering that the video file is empty. The satellite TV may then accordingly display a message informing the viewer that an empty video was received. Furthermore, the embodiments of the present invention may also apply to methods related to file manipulation, such as file conversion, optical character recognition (OCR), filing, and other processes, which may benefit in the empty detection processes described herein. For example, after detecting that the input object/file is empty, an OCR application module may be instructed not to perform an OCR process. While FIG. 1 depicts the EOD module 106 as being part of the DPU module 116, the EOD may also be a part of the application module(s) 102 or downstream as part of either the communication medium 140 or rendering device(s) 150, 180.

In some embodiments, the imaging/rendering device 150, 180 may function as an output device, i.e., render an output, for example, as shown in FIG. 1, where the client computing device 110 or another imaging/rendering device (not shown), submits an object, e.g., print object to a device 150, 180 for printing. In some embodiments, the object submitted/transmitted by the client 110, includes the input object to be printed and optionally a set of control instructions, such as imaging instructions, e.g., printer job language (PJL) or Simple Object Access Protocol/Extensible Markup Language (SOAP/XML), compatible with the receiving or output imaging/rendering device, so as to enable the output imaging/rendering device to render an output from the received input object, e.g., in accordance with the optional set of imaging instructions and/or device default settings. The imaging/rendering devices may function as output devices on processes that may include for example, printing, copying, outbound faxing, filing, publishing, including image transfers, conversions, video and/or audio presentation.

One of ordinary skill in the art will also appreciate that other modules may be included in the exemplary computing device 110 of the present invention. Such additional modules, for example, may include an operating system, a central processing unit, a network communication module, a network interface card, and other modules typically adapted to support the functions and capabilities of the computing device 110. These additional modules may be hardware, a set of program instructions, e.g., software, and or both hardware and software, i.e., firmware.

FIG. 2 is a high-level block diagram of another exemplary system 200 according to an embodiment of the invention. This system 200 is similar to that in FIG. 1, but the image/rendering devices 250, 280 may function as the input device, i.e., the source of input data or object/file. Although not shown, the imaging/rendering device 250 operably coupled to the network 240 may also contain the same or similar modules contained in the imaging/rendering device 280 attached to the exemplary computing device 210. The imaging/rendering device 250, 280 may include an input processing module 204 typically adapted to process input signals or data depending on the function of the device 250, 280. For example, if the imaging/rendering device 250, 280 is a scanner, the input processing module 204 is adapted to scan and create an input object that is going to be transmitted or submitted to another device, for example, a computing device 210 or to another imaging/rendering device. The receiving device, e.g., computing device 210, in turn, renders the submitted object, in accordance with an optional set of imaging instructions and/or default settings. The imaging/rendering device thus may function as an input device on processes that may include for example, scanning, inbound faxing, and/or file retrieval.

Referring to FIGS. 1 and 2, other imaging/rendering devices of the present invention may also include copiers, scanners, document/image servers—e.g., filing devices, web publishing devices, electronic whiteboards, digital cameras, digital protection systems, digital TV, satellite radio, media players, computing devices—e.g., personal computers, and medical imaging devices—e.g., digital X-ray machines or magnetic resonance imaging (MRI) devices. Furthermore, the DPU module 216, which may include the EOD module, may be adapted to run on host computing device and/or an imaging/rendering device. The DPU module 216 and/or EOD module 206 is adapted to despool or receive input objects and optional control information, e.g., job settings for rendering/outputting the input objects directly to or from the imaging/rendering device.

Although the various embodiments of the invention are exemplified herein within the MICROSOFT (MS) WINDOWS™ family of operating systems, the embodiments of the present invention may also apply to other operating systems, such as, but not limited to, APPLE MACINTOSH™ operating system (OS), Linux OS, System V Unix OS, BSD Unix OS, OSF Unix OS, SUN™ Microsystems Solaris OS, HP™ IUX and UX OSs, and IBM™ Mainframe MVS OS.

Figure 3:
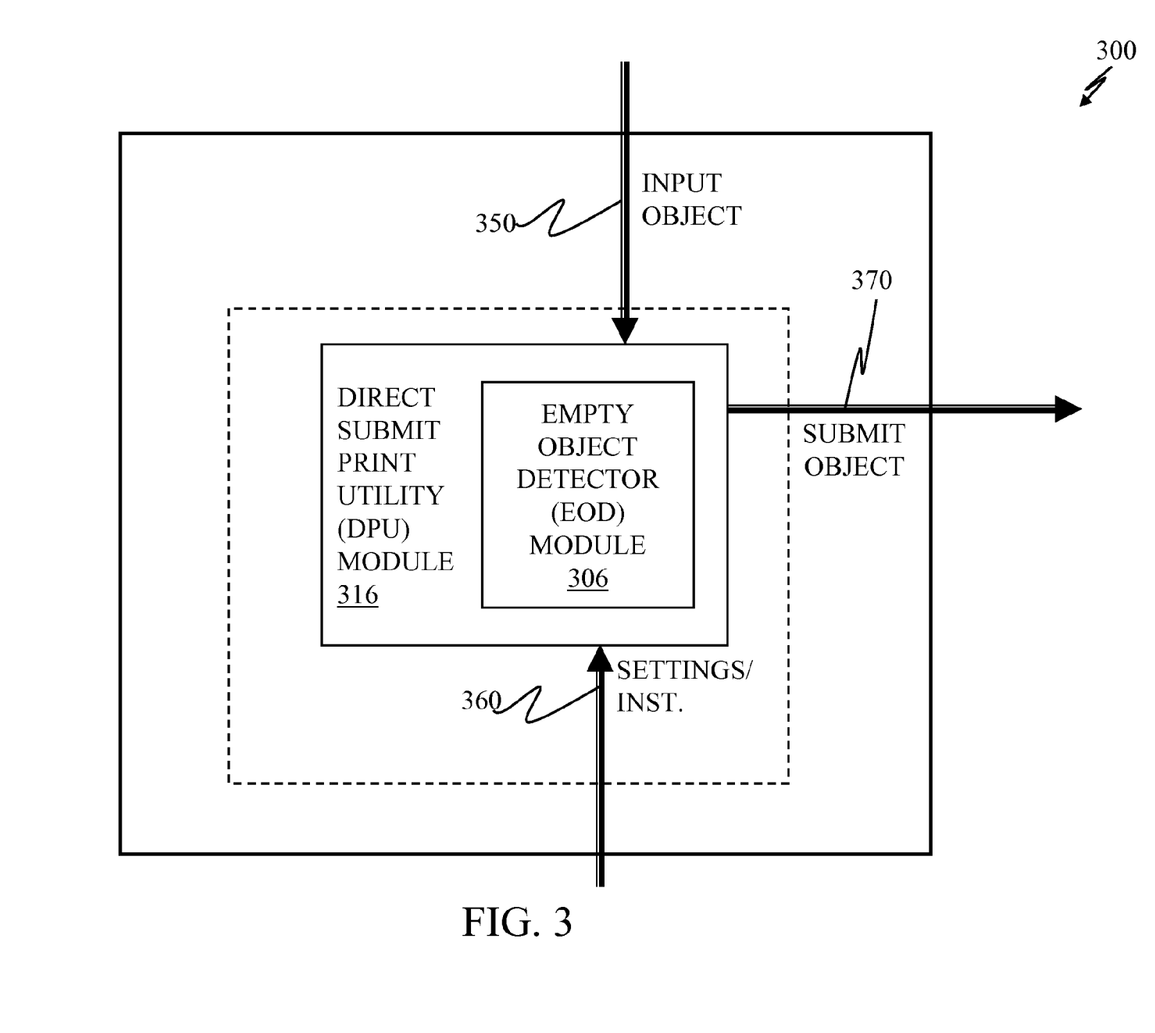
FIG. 3 is a high-level data flow diagram according to an embodiment of the invention.

FIG. 3 is a high-level diagram of an exemplary data flow 300 according to some embodiments of the present invention. The exemplary data flow is described in relation to the computing device 110 of FIG. 1 but may also be adapted to apply to the imaging/rendering device 250, 280 of FIG. 2, for example, if the imaging/rendering device includes the DPU module and/or EOD module. Furthermore, the EOD module 306 and the DPU module 316 may be embodied as separate modules interfacing with each other, rather than as one integrated module as shown.

The exemplary data flow diagram 300 exemplified herein relates to objects that are print objects. The input objects/files 350 received by the DPU module 316 may include those processed by remote or local application modules. These input objects/files are typically sent to the DPU module and/or EOD module, for example, due to a user's request to print an object/file. For example, a PDF object/file is typically sent to the DPU module when a user's selects the print request option within an application that supports printing of PDF files. These input object/files may have been submitted, e.g., by application modules, background processes, and batch jobs, to the DPU module for printing, for example. These input objects/files 350 may be located local or remote to the computing device 110, so long as these input/objects are accessible by the computing device and/or the DPU 316 in particular. Once received by the DPU module 316, the EOD module determines whether the input object 350 is empty. In some embodiments, an input object is considered empty if it is blank, i.e., the output of the input object may result in no ink on paper, for example, if printed by the printer or if faxed and printed by the fax machine, no ink is instructed to be placed or dropped on the paper. In another example, if the ink drop is so small that it may be indiscernible or very difficult to read by the naked eyes, such input object may be considered as blank. An input object may also be considered empty if the object/file itself does not contain any data and/or may result in no output, e.g., zero pages, when printed. An input object may also be considered empty, if processed, the ink drops may be outside the printable area of the output document, or may be obscured, e.g., the ink may be placed on the binding margin. An input object may also be considered empty, if the ink drops may not produce a meaningful output to the user, e.g., such as a stray line at the bottom of an outputted sheet. Algorithms determining whether an object is empty are exemplified further below.

The DPU module 316 may also receive additional information 360, such as control information, which may include device settings, imaging and/or rendering instructions, printer instructions, and/or printer control languages. This set of information 360 may be incorporated as part of the submitted object 370, transmitted to an output device for output rendering or processing, or transmitted to an intermediary device, for example, for temporary storage or queuing.

In some embodiments, the input objects/files first undergo some processing, e.g., printer driver processing, before being received by the DPU module and/or EOD module. In other embodiments, the input objects processed by the DPU module 316 are in their original or native formats, e.g., not processed by printer driver(s) and are typically directly submitted as print objects to printers or imaging/rendering devices without undergoing printer driver processing. This process is typically called driverless printing. In general, a printer driver is a set of program instructions—e.g., software application—that converts an object, e.g., an MS WORD document, a portable document format (PDF) file, or a text file, to be printed to a form specific to a printer. The output printers or imaging/rendering devices adapted to receive print objects or submitted objects 370 of the present invention may be adapted to directly render and or output, without any imaging or printer driver, a variety of application object formats. The DPU module and/or the EOD module is thus adapted to receive and process input objects 350 in their native or original formats or in converted formats, e.g., printer-driver processed. Thus, both driverless and driver-based printing processes may be handled by the empty object detection process described herein. For driver-based printing, for example, the empty object detection process may be performed on the input object prior to being sent to the printer driver—i.e., applied to the input object in its original document format, within or part of the printer driver process—e.g., applied to the input object after being converted by the operating system into its graphical format such as graphics device interface (GDI), or after the input object has been printer-driver processed—e.g., when the input object is in printer-ready format such as in printer control language (PCL) or postscript (PS) format.

Figure 4:
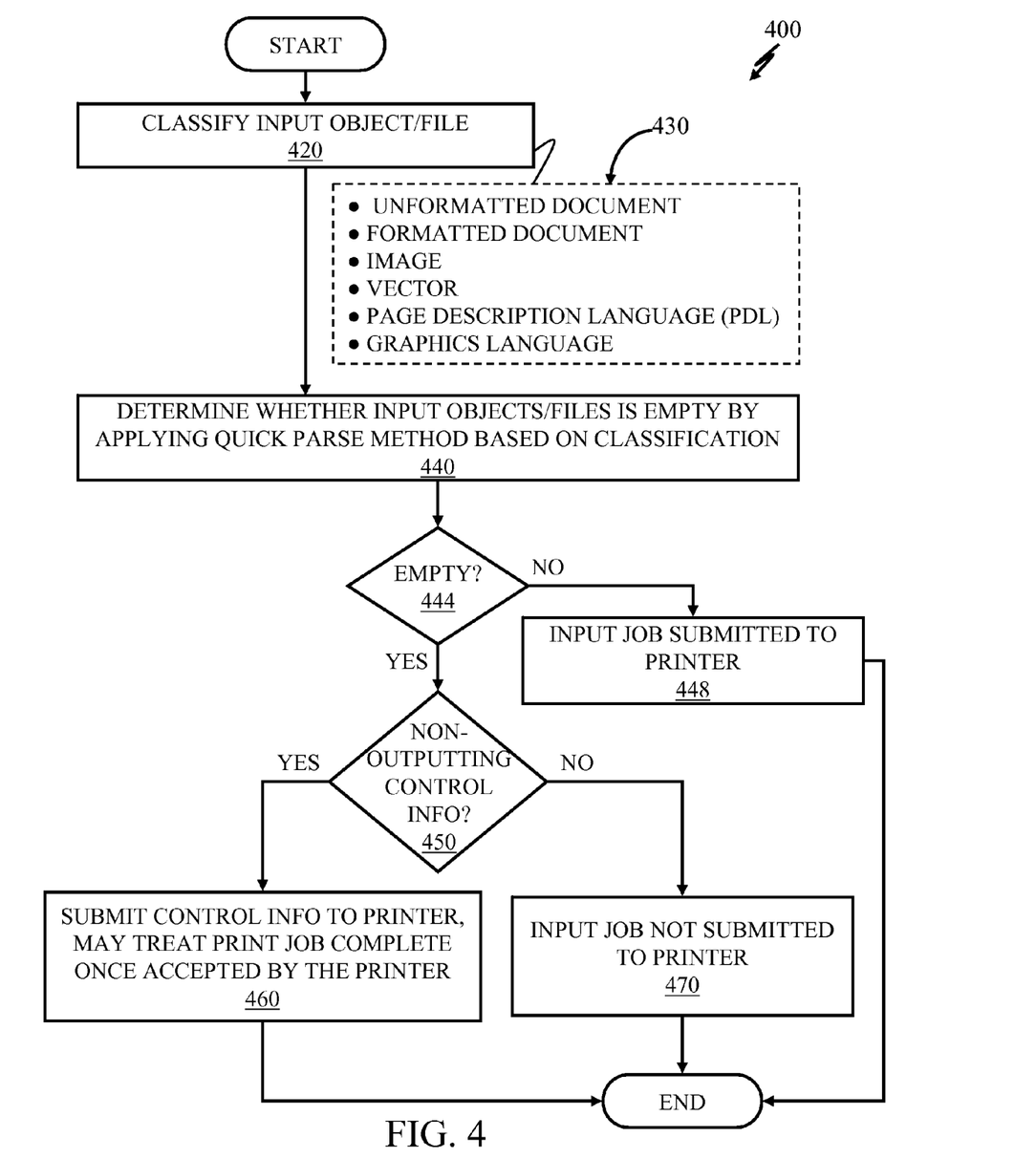
FIG. 4 is a high-level flowchart of an exemplary empty object detection process according to an embodiment of the invention.

FIG. 4 is an exemplary empty object detection process 400, which may be performed by the EOD module and/or the DPU module according to an embodiment of the invention. After receiving the input object, for example, by the DPU module 316, the EOD module 306 first classifies the input object/file (step 420), into one of the following format classifications 430:

1. Unformatted Document Format;
   a. Plain text or ASCII text
   b. Extensible Markup Language (XML)
2. Formatted Document Format;
   a. Portable Document Format (PDF)
   b. Rich Text Format (RTF)
3. Image Format;
   a. Tagged Image File Format (TIFF)
   b. Joint Photographic Experts Group (JPEG)/JPEG File Interchange Format (JFIF)
   c. Portable Network Graphics (PNG)

d. Graphics Interchange Format (GIF)
e. Exchangeable Image File Format (Exif)
f. Bitmaps, e.g., MS WINDOWS bitmaps
4. Vector Format;
   a. Scalable Vector Graphics (SVG)
   b. Hewlett-Packard printer control language (HP-GL), including HP-GL/2
5. Page Description Language (PDL) Format; and
   a. Printer Command Language (PCL), including PCL 6 Enhanced formerly known as PCL XL
   b. Postscript (PS)
6. Graphics Format
   a. Enhanced Metafile (EMF)
   b. MICROSOFT™ XPS format.

Under each of the format classification type above are examples of objects/files associated with such format type. In some embodiments, the exemplary classification types described above may be modified, for example, to adapt to other file structures and data storing identification means.

Classifying the input objects/files may be performed in a number of ways. For example, certain format types have unique signatures, such as character strings, that typically uniquely identify the format type. For example, a string "%PDF" in a header of an object/file typically indicates that the file is a PDF file. The file structures of most or all of the exemplary object/files below are defined by various standard groups and/or specifications and are typically available. Table I below shows exemplary format types and their associated typically unique signatures, thereby identifying the particular file.

TABLE 1

Exemplary Signatures Associated with Certain File Types

| Format Classification Type | File Type | Signature |
|---|---|---|
| Formatted Document | PDF | %PDF |
| Formatted Document | RTF | {\rtf1\ansi |
| PDL Format | PJL | @PJL |
| PDL Format | PS | %!PS |
| PDL Format | PCL | <ESC>E |
| PDL Format | PCL XL | ) HP-PCL XL; |
| Image Format | TIFF | II*<NUL> or MM<NUL>* |
| Image Format | JPEG | 0xFF 0xD8 0xFF 0xEE |
| Image Format | JPEG 2000 | 0xFF 0x4F |
| Image Format | PNG | 0x89PNG |
| Image Format | GIF | GIF87a OR GIF89a |
| Image Format | MS Windows Bitmap | BM |
| Vector Format | SVG | <svg |

In other embodiments, the format classification of an input object/file may be determined by either the presence or absence of sequences. For example, an unformatted text object/file may be determined by a file suffix or file extension that may indicate that the contents are unformatted, e.g., the ".txt" file extension indicated unformatted document type. Other extensions, for example, ".JPG" or "JPEG" may indicate a JPEG file, while a ".BMP" may indicate an MS WINDOW bitmap file. In other embodiments, the recurring presence of certain character constructions or strings, e.g., "<svg . . . >" may indicate an SVG file.

Each of the above format classifications, defined above, is typically associated with a quick parse method, which is based on the format classification of the input object/file. The exemplary quick parse method is adapted to determine if the input object contains any nonempty elements, e.g., pages, drawings, text, and/or data to render, or put in another way, to determine if the input object does not contain any nonempty elements. The exemplary quick parse methods described herein typically do not interpret data of the input object, and typically only a small and/or select portion of each input object is parsed to determine the existence of nonempty elements or other relevant information. Furthermore, typically not all the contents or data of the input object/file are parsed.

After classification, the appropriate quick parse method is applied typically based on the classification format type (step 420) to determine whether the input object/file 350 is empty (step 440). One of ordinary skill in the art will appreciate that the classifying and the quick parsing steps (steps 420 and 440) may be performed in the same operation. If the input object/file is not empty (step 444, "no" branch), the input object/file is then submitted to the printer for normal processing (step 448). On the other hand, in some embodiments, once it is determined that the input object/file is empty (step 444, "yes" branch), e.g., the output, if rendered, typically does not result in any sheets or pages being printed or faxed and/or there is either no discernable or meaningful ink on paper result, the DPU module and/or the EOD module, but particularly the DPU module, may additionally determine if the input object/file contains non-outputting or non-rendering control information (step 450). Control information typically includes information that is typically not rendered but indicates how the output image/rendering device is to be configured—device configuration/reconfiguration information, for example. Such control information, may include, but is not limited to, scripting instructions, device setting instructions, environment settings, form and/or font download information, device processing instructions, e.g., set to staple mode, and other information that may configure and/or control the output imaging/rendering device. If the input object/file does contain at least one non-outputting control information, (step 450, "yes" branch), the DPU module may then submit or transmit the control information to the appropriate output printer, and may also identify the print job as complete once the input object/file has been accepted or received by the printer (step 460). Typically, only the non-outputting control information is transmitted and the empty input object/file is not. In some embodiments, the DPU may optionally disable waiting for a final output job completion notification from such printer. In other embodiments, the printer may send final notification information—rather than printing such notification on a printed output—regarding device configuration status, e.g., successful or not, based on the transmitted control information. In some embodiments, the print job may be treated as complete, for example, if no further output processing has to be performed on the object/file. A completed job may also result in informing the user that the print job is complete, which may include indicating that no rendered output is expected. The user may optionally be informed that the control information has been sent. Typically, in a normal course of operation, acknowledgements, including status exchanges, between the DPU and the printer or output imaging/rendering device may be exchanged.

On the other hand, if the empty job does not contain any control information (step 450, "no" branch), the DPU module typically does not submit the object/file to the printer, considering that there is nothing to print and no control instructions are contained in the object/file (step 470). The DPU may also inform the user that the print job submitted is an empty file and the print job is now complete, for example (step 470).

Figure 5:
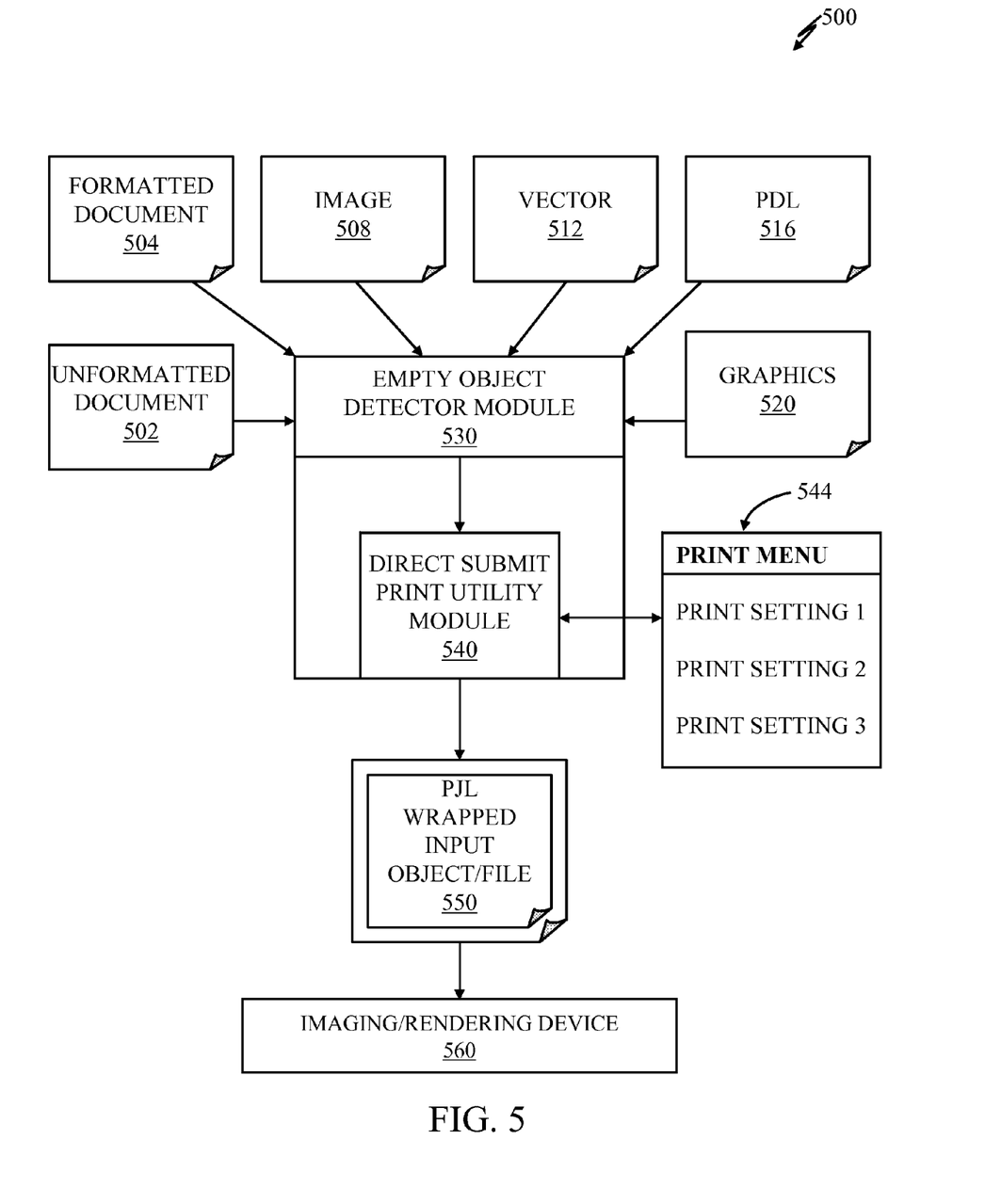
FIG. 5 is a high-level block diagram of an exemplary empty object detection process, according to an embodiment of the invention.

FIG. 5 is an exemplary high-level block diagram 500 representing the empty object detection process of the present invention. Generally, the input objects/files are classified into various format types, 502, 504, 508, 512, 516, 520. The DPU module may also receive control information, e.g., printer or device setting information, typically based on default values or based on information selected or indicated 544 by the user. Such control information may include the number of copies, mode—e.g., duplex or not, staple settings, and other setting or environment information. The user selection may have been provided via menu option selections. The input object/file may be encapsulated or combined with PJL commands 550 so as to provide the printer with information, such as printer and/or environment settings and to enable status exchange between the printer and the host computer, e.g., the computing device or the DPU module 540 that submitted the print job request or submitted the object/file for printing. In other embodiments, the PJL commands may indicate the start and end of a job 530, for example. Other features provided by PJL commands are known to those of ordinary skill in the art. The PJL wrapped input object/file 550 is then submitted to the printer or rendering/imaging device 560 for output processing.

Figure 6:
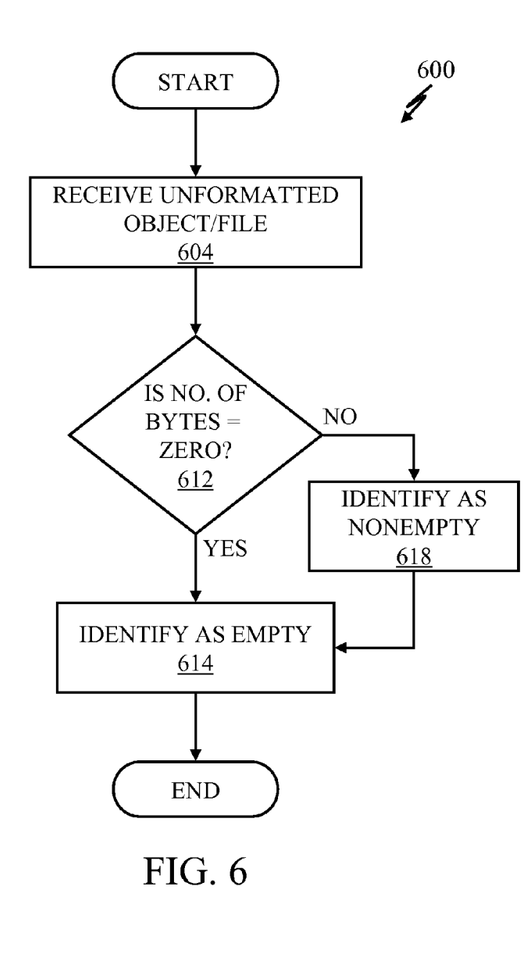
FIG. 6 is a high-level flowchart of an exemplary process to detect whether an unformatted document object type is empty, according to an embodiment of the invention.

FIG. 6 is a high-level exemplary process 600 to determine whether an unformatted document object/file is empty. After receiving and classifying the object/file as an unformatted document type (step 604), a check is made to determine whether the number of bytes, i.e., the nonempty elements, contained in the object/file is zero (step 612). If the number of bytes is greater than zero, then the object/file is checked for the presence of a non-whitespace printable character. Typically, the presence of any non-whitespace printable character sequence or string in an unformatted document type represents nonempty elements or data to be rendered or outputted by the output rendering/image device. Furthermore, an unformatted document typically does not contain any formatting instructions, thus if the unformatted document consists of one or more bytes, that job is a nonempty object/file, i.e., it may include nonempty elements (step 618). If the number of bytes for that object/file is zero, or the number of non-whitespace printable bytes is zero, that object/file is identified as empty (step 614).

Figure 7:
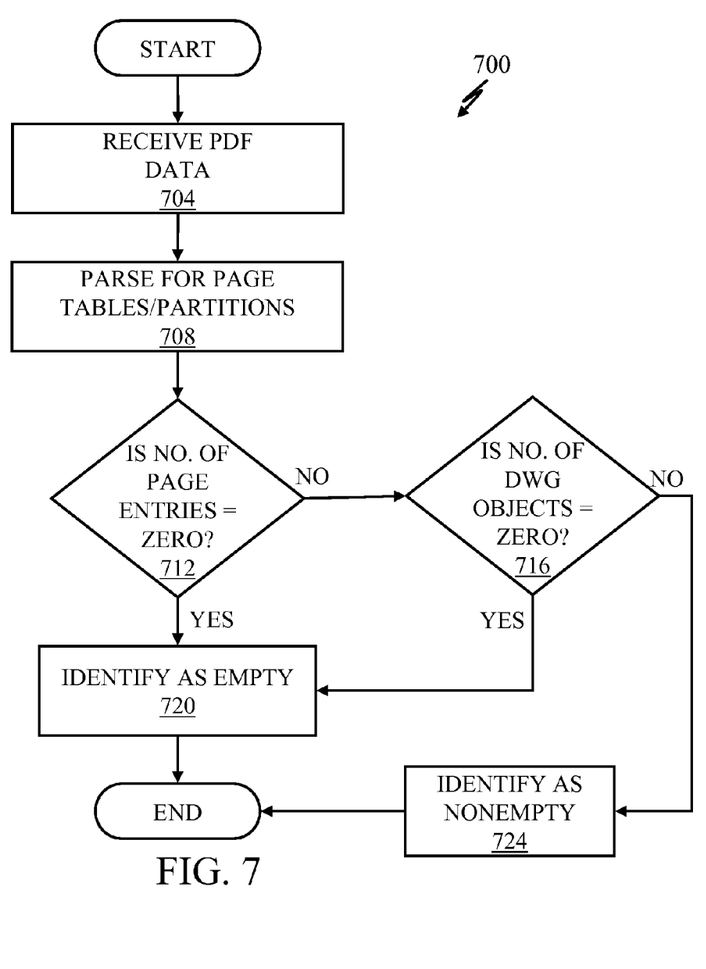
FIG. 7 is a high-level flowchart of an exemplary process to detect whether a formatted document object type is empty, according to an embodiment of the invention.

FIG. 7 is a high-level exemplary process 700 to determine whether a formatted document object/file is empty. After receiving and classifying the object/file as a formatted document type (step 704), the DPU module and/or the EOD module parses the input object/file to locate or detect the presence of page information, for example, either as a page table or page partitions (step 708). The page table or page partitions typically function as nonempty element indicator locations. For formatted documents, which typically have page-table structures, the page tables or references to their locations typically appear at the beginning or end of the object/file. Thus, page tables may be quickly identified and examined without parsing the entire input data or object/file. For PDF format or files, e.g., the page-table structure information is typically contained in the cross-reference table area. The cross-reference table area of PDF version 1.6, for example, typically contains information that enables random access to indirect objects within the PDF object/file. The trailer area of a PDF object/file typically provides the location of the cross-reference table. For those formatted documents, which layout the page data sequentially, e.g., page by page in a certain order, in some embodiments, typically only a leading portion of the object/file has to be initially parsed to identify the start of the first page, if any.

In general, if no page table(s) or page partitions are detected, e.g., if page entries is equal to zero, (step 712), then the print object/file or print job is considered empty (step 720). Otherwise, each page is then sequentially examined to determine whether the page contains nonempty elements, particularly, drawing commands that may result in a rendered output, e.g., results in ink on paper (step 712, "no" branch). Once a single drawing command is detected, the parsing process may be stopped without examining or parsing the remainder of the pages or the object/file (step 716, "no" branch), and the print job or object/file is considered nonempty (step 724). Otherwise, if none of the pages is determined to contain any drawing commands, the object/file is considered empty (step 720).

Figure 8:
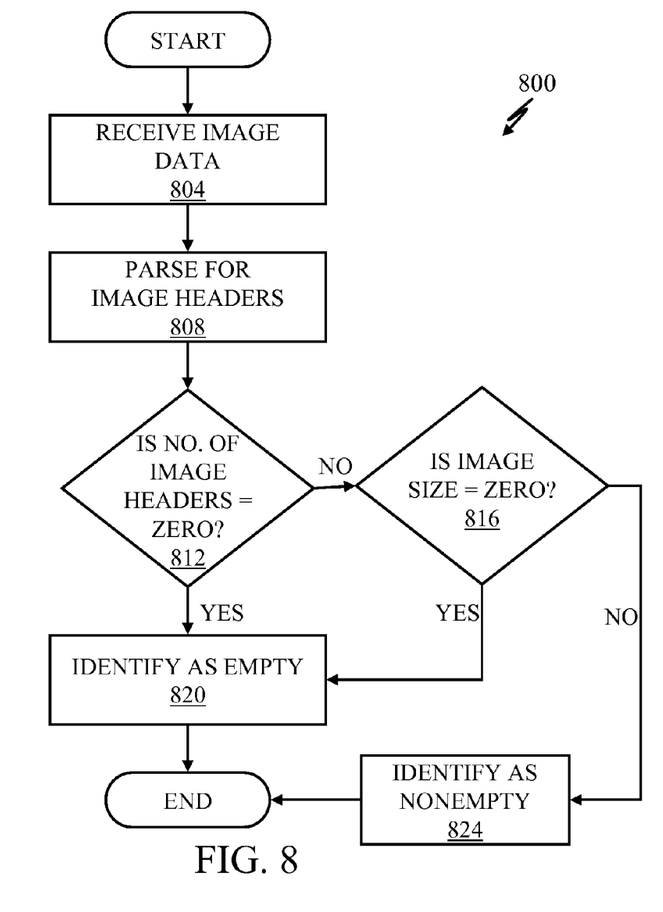
FIG. 8 is a high-level flowchart of an exemplary process to detect whether an image object type is empty, according to an embodiment of the invention.

FIG. 8 is a high-level exemplary process 800 to determine whether an image object/file is empty. After receiving and classifying the object/file as an image type (step 804), the DPU module and/or the EOD module parses the input object/file to locate the presence of nonempty element indicator locations, particularly image headers (step 808). Image headers are generally located or defined at the beginning of the object/file, and if the object/file contains multiple headers, the image headers are typically sequentially linked. Image headers may be quickly identified and examined typically without parsing the entire input object/file. For example, the Image File Directory (IFD) is an exemplary image header of a TIFF file. Other examples of image object type may include JPEG and PNG files.

If no image headers are detected (step 812, "yes" branch), then the object/file is considered empty (step 820). Otherwise, each image header is sequentially examined to determine whether the image entry contains a definition of an image to render, i.e., a nonempty element (step 816). An image to be rendered by an output device, such as a printer, for example, may be defined generally in one of two ways:

1. A definition which defines a non-zero size region in which the image is to be rendered into, or
2. A reference to a non-zero size location of the image data.

If any of the above two definitions are encountered, the object/file is identified as nonempty (step 824). Otherwise (step 816, "yes" branch), the object/file is identified as empty (step 820).

Figure 9:
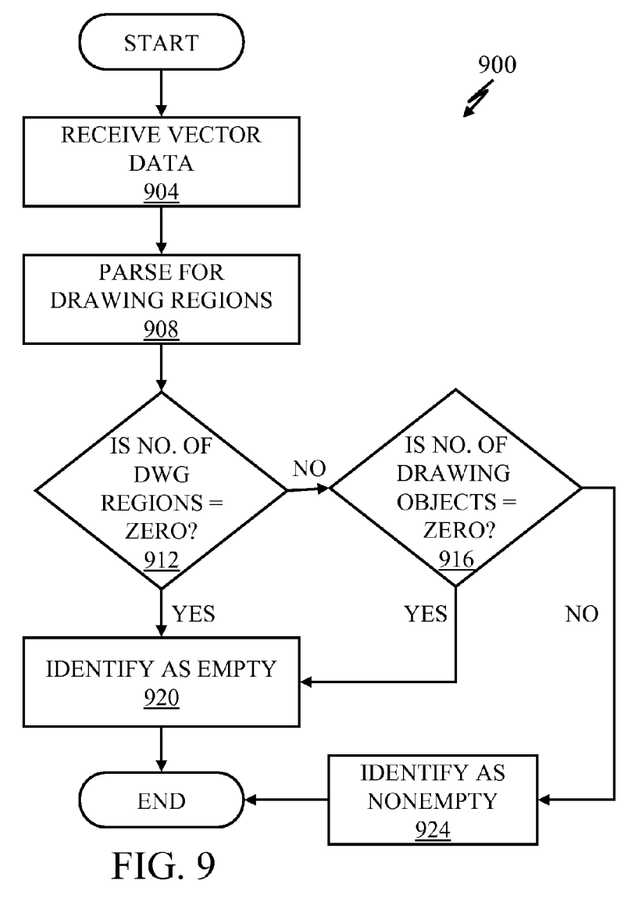
FIG. 9 is a high-level flowchart of an exemplary process to detect whether a vector object type is empty, according to an embodiment of the invention.

FIG. 9 is a high-level exemplary process 900 to determine whether a vector data object/file is empty. After receiving and classifying the object/file as a vector data type (step 904), the DPU module and/or the EOD module parses the input object/file to locate the presence of nonempty element indicator locations, particularly drawing regions (step 908). In this exemplary classification, drawing regions may be easily recognized by a leading indicative byte or character sequence. A vector object/file may be quickly parsed by searching for certain expression matches.

The Scalable Vector Graphics (SVG), for example, is an XML markup language for describing vector graphics. The SVG recommendation comes from the World Wide Web Consortium (W3C) and generally describes the manner to create vector graphics using a mark up language. SVG, for example, defines a rectangle with a "<rect . . . />" tag. For example, "<rect x="100" y="100" width="400" height="200" fill=""red" stroke="black" stroke-width="3"/>" describes a rectangle. The SVG specification typically defines a rectangle by the following:

rect—the rectangle is declared using a rect element;
x, y—the coordinates of the top left corner of the rectangle;
width, height—the width and height of the shape, which may also be expressed as percentages;
fill—the interior color of the shape;
stroke—the line color for the rectangle; and
stroke-width—the thickness of the line used to draw the rectangle.

Other drawing elements are also defined within the SVG specification, for example, circles, ellipses, lines, polylines, and polygons. Furthermore, SVG in general supports vector graphic shapes, images, and text. In this exemplary vector classification, the object/file may be searched for typically all the elements that define drawing regions, i.e., possible nonempty elements, for example, searching for the string characters "<rect" and other graphic elements to indicate drawing regions. In other embodiments, a determination is made as to whether the drawing definition is of a certain dimension, e.g., the dimension is of a size that there is actually ink on paper, the width and height value exceeds zero or a defined threshold, the stroke width value is greater than zero or a defined threshold, or if the percentage value of the width and height is greater than zero or a defined threshold.

If no drawing regions are detected (step 912), the print job or the object/file is identified as empty (step 920). Otherwise (step 912, "no" branch), each drawing region is then sequentially examined in the object/file to determine whether the region indicates or does contain nonempty elements, particularly, drawing commands that may result in a rendered, e.g., ink on paper, output or an output based on a defined condition. Once any drawing command is detected, the parsing process is stopped without examining/parsing the remainder of the drawing regions or the object/file, and the object/file is considered nonempty (step 924). Otherwise, if all drawing regions are determined to not contain drawing commands, the object/file is considered empty (step 920).

Figure 10:
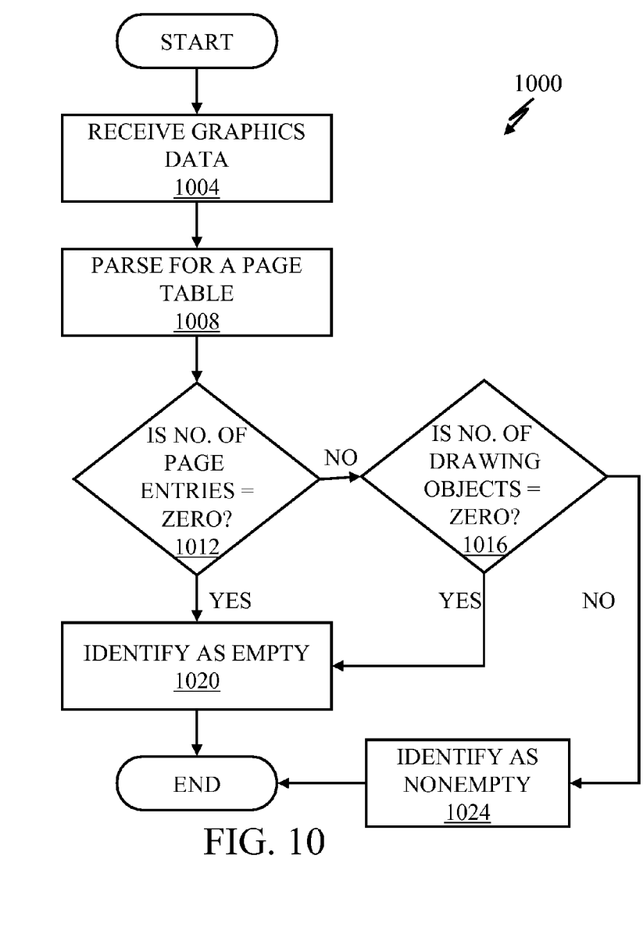
FIG. 10 is a high-level flowchart of an exemplary process to detect whether a graphics object type is empty, according to an embodiment of the invention.

FIG. 10 is a high-level exemplary process 1000 to determine whether a graphics data object/file is empty. After receiving and classifying the object/file as a graphics data type (step 1004), the DPU module and/or the EOD module parses the input object/file to locate the presence of nonempty element indicator locations, particularly, page table(s) or records (step 1008). The page tables or references to their locations or records are typically defined or located at the beginning of the object/file. The page tables or records typically may be quickly identified and examined without parsing the entire input object/file.

If no page table(s) or record(s) are detected (step 1012), the object/file is considered empty (step 1020). Otherwise (step 1012, "no" branch), each page referenced in the page table or record entry is then sequentially examined to determine whether the page or referenced record entry contains nonempty elements, particularly drawing commands that may result in a rendered output, e.g., based on a defined condition. If no such commands are found (step 1016, "yes" branch), the object/file is considered empty (step 1020). Once any drawing command is located or detected indicating the presence of a drawing object, the parsing process is stopped without examining or parsing the remainder of the pages and the object/file, and the object/file is considered nonempty (step 1024).

An example of a graphic data type is an MS EMF file, typically indicated with the ".wmf" or the ".emf" extension. MS WINDOWS Metafile or Enhanced Metafile file formats typically contain a header, followed by one or more records of drawing objects typically stored as MS WINDOWS Graphics Device Interface (GDI) commands. The GDI is used by MS WINDOWS to perform output to a screen window or other output device. When the metafile data are rendered/outputted or played back, for example, the data from each record are typically applied to perform the appropriate function call to render each object in the image. The last record in the object/file typically contains information indicating that the end of the record data has been reached. If the graphics object/file, for example, is an EMF file, the quick parse algorithm of the present invention typically parses to determine if GDI commands adapted to render an output, for example, with ink on paper or defined threshold, is present so as to identify whether an object/file is to be considered as empty or nonempty, for example.

Figure 11:
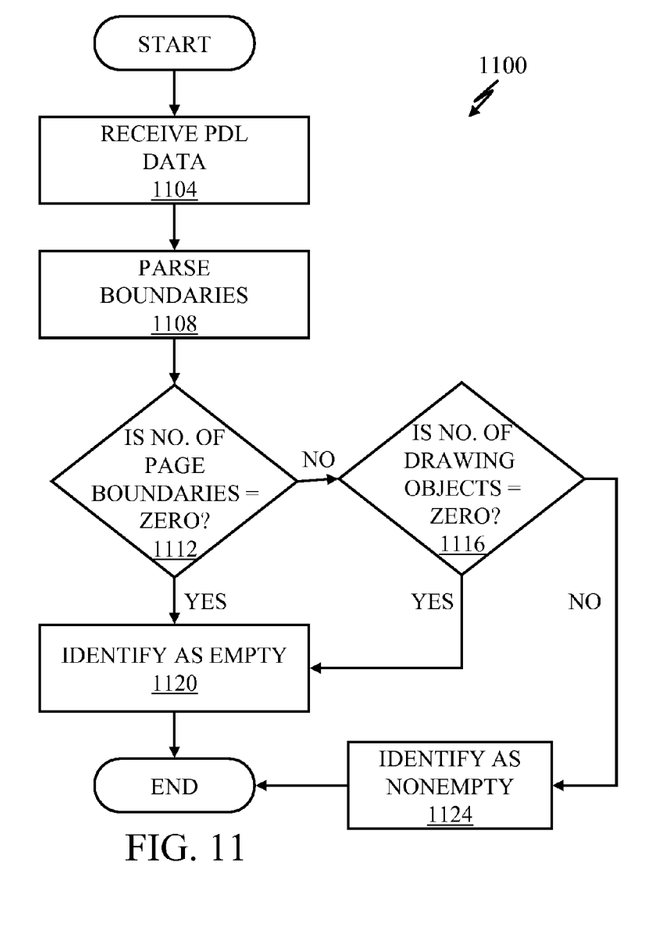
FIG. 11 is a high-level flowchart of an exemplary process to detect whether a printer description language (PDL) object type is empty, according to an embodiment of the invention.

FIG. 11 is a high-level exemplary process 1100 to determine whether a PDL object/file type is empty. After receiving and classifying the object/file as a PDL type (step 1104), the DPU module and/or the EOD module parses the object/file to locate the presence of nonempty element indicator locations, particularly page partitions or boundaries (step 1108). Examples of PDL object types include object/files that are PCL, PCL/XL, PS, and EPSON™ ESC/P™ OR ESC/P2™ files. With this classification format type, typically only the leading portion of the file has to be parsed to identify the start of the first page or first boundary, if any.

If no page partitions or boundaries are detected (step 1112, "yes" branch), then the object/file is considered empty (step 1120). Otherwise, each partition or boundary is then sequentially examined to determine whether the partition or boundary contains nonempty elements, particularly drawing commands that may result in a rendered output, e.g., based on a defined condition. If any command is detected (step 1116, "no" branch), the parsing process is stopped without examining or parsing the remainder of the partitions or boundaries, and the object/file is considered nonempty (step 1124). Otherwise, if none of the boundaries or partitions are determined to contain drawing commands, the output/object is considered empty (step 1120).

Referring back to FIGS. 1, 2, and 3, for example, the DPU module and/or EOD module of the present invention thus may include knowledge of various file structure formats, including the manner of defining nonempty elements and the structure and format of nonempty element indicator locations, as discussed above. In some embodiments, the empty object detection process may be embodied as a set of program instructions that may interface with a database, e.g., a relational database. The database, for example, may contain file structure information, including content definition or other information enabling the empty object detection process to appropriately parse the input/object, e.g., special tag elements definitions, signature information, data structure definition, commands or function calls, and file extensions. Furthermore, one of ordinary skill in the art will appreciate that the process of determining whether an object/file is empty may all be coded programmatically, for example, in a software application or set of program instructions.

In other embodiments, an object/file may be parsed for more than one type of information. For example, in FIG. 9, the exemplary process is described in relation to searching for drawing regions. An SVG file, however, may include not only vector graphics commands but also text and raster image graphics. The parsing algorithms of the present invention typically consider other element types that may result in a rendered output, thus there may be combinations of parsing algorithms, for example, not only consider drawing regions but also text and alternate image formats, e.g., raster graphics, in determining whether a file is empty or not. To further explain, for example, vector graphics generally relate on instructing the printer to print from one location to another. To some extent, it may be viewed as having the printer have a "pen up" or "pen down" operation. Thus, in vector graphics, the embodiments of the present invention read or parse the object/file to determine when the "pen is down" so that ink is instructed to be drawn or placed on the paper, for example. Similarly, with bitmaps or raster graphics objects/files, which may indicate actual print or ink location, the embodiments of the present invention read or parse the object/file to determine when the ink is actually placed on paper or at least instructed to, based on the commands, for example, contained in the object/file.

The embodiments of the present invention may also apply to input objects/files with mixed format type classification, e.g., have more than one file format content. An input object/file, for example, may be a combination of vector graphics and image data or a combination of formatted data, image, and page description language. Depending on the mixture of format type classification, one or more empty object detection algorithms may thus be applied. Typically, once the input object/file is identified as nonempty, the other format classification algorithm may be skipped.

The embodiments of the present invention may also be applied as a blank page detection process so as to suppress or delete blank pages upstream from the printer, i.e., prior to the object/file being transmitted to the printer. This may be performed as part of the parsing process, such that if a page or output delineation is deemed empty, the output imaging/rendering device is instructed to not print such page, or alternatively modify the actual object/file so that the blank page is suppressed or deleted. Additionally, for accounting systems that calculate or pre-calculate resources, e.g., sheets of paper, utilized in the print job, the embodiments of the present invention may also be used to determine the presence and number of blank pages. Additionally, the suppression of blank page printing may be automatic or interactive, e.g., requiring operator confirmation.

Embodiments of the present invention may be used in conjunction with networks, systems, and devices that may employ object/file processing particularly printing of object/files. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method comprising:
   detecting, by a computing device, from a parsed portion of a file, for at least one nonempty element, the at least one nonempty element adapted to indicate that the file is nonempty; and
   if two or more nonempty elements are detected, then sequentially detecting, by the computing device, for at least one nonempty element, and then identifying the parsed file as a nonempty file based on the sequential detection.

2. The method of claim 1, further comprising the step of:
   if no nonempty elements are detected, by the computing device, within the parsed file, then identifying the file as an empty file; and
   if the file is an empty file, not transmitting the file, via a direct submit print utility of the computing device, to an output image/rendering device.

3. The method of claim 1, further comprising the step of:
   transmitting, via a direct submit print utility of the computing device, control information to an output imaging/rendering device.

4. The method of claim 1, further comprising the step of:
   parsing the file received by the computing device based on one or more file classification format types; and
   classifying the parsed file into the one or more file classification format types, by the computing device, performing at least one of the following steps:
   detecting signatures within the file;
   determining file extension of the file; and
   detecting one or more character sequences within the file.

5. The method of claim 4, wherein the one or more classification format types are selected from the group comprising:
   an unformatted document type;
   a formatted document type;
   an image type;
   a vector type;
   a page description language type; and
   a graphics type.

6. The method of claim 4, wherein the one or more classification format types comprise an image type.

7. The method of claim 4, wherein the one or more classification format types comprise a vector type.

8. The method of claim 4, wherein the one or more classification format types comprise page description language (PDL) type.

9. The method of claim 4, wherein the parsing step and the detecting step are stopped when at least one nonempty element is detected.

10. The method of claim 1, wherein the step of detecting, by the computing device, from a parsed portion of the file for at least one nonempty element, further comprises the steps of:
    detecting, by the computing device, for nonempty indicator locations, wherein an empty file is identified if no nonempty indicator locations are detected; and
    if two or more nonempty indicator locations are detected, sequentially detecting, by the computing device, for at least one nonempty element associated with at least one of the one or more nonempty indicator locations.

11. The method of claim 1, wherein the step of detecting, by the computing device, for at least one nonempty element, further comprises the steps of:
    detecting, by the computing device, for page information entries, wherein an empty file is identified if no page information entries are detected; and
    if one or more page information entries are detected, sequentially detecting, by the computing device, for at least one nonempty element associated with at least one of the one or more page information entries.

12. The method of claim 1, wherein the step of detecting, by the computing device, for at least one nonempty element, further comprises the steps of:
    detecting, by the computing device, for image headers, wherein an empty file is identified if no image headers are detected; and
    if one or more image headers are detected, sequentially detecting, by the computing device, for at least one nonempty element associated with at least one of the one or more image headers.

13. The method of claim 1, wherein the step of detecting for at least one nonempty element, further comprises the steps of:
- detecting, by the computing device, for drawing regions, wherein an empty file is identified if no drawing regions are detected; and
- if one or more drawing regions are detected, sequentially detecting, by the computing device, for at least one nonempty element associated with at least one of the one or more drawing regions.

14. The method of claim 1, further comprising the steps of:
- receiving, by an output image/rendering device, the parsed file; and
- indicating, by the output image/rendering device, that the parsed file is an empty file.

15. The method of claim 1, wherein the step of if no nonempty elements are detected, by the computing device, within the file, then identifying the file as an empty file, further comprises the steps of:
- determining, by the computing device, whether a control information has non-outputting information; and
- if the control information has non-outputting information, then transmitting, via a direct submit print utility of the computing device, the file to an output image/rendering device.

16. The method of claim 1, further comprising:
- if the file is nonempty, then transmitting, via a direct submit print utility of the computing device, the file to an output image/rendering device.

17. The method of claim 1, wherein the nonempty element comprises at least one of: nonempty indicator locations, page information entries, image headers, and drawing regions.

18. A device comprising:
- a computer-readable non-transitory medium storing an empty object detection module adapted to:
  - detect for at least one nonempty element from a parsed portion of a file, the nonempty elements adapted to indicate that the file is nonempty; and
  - if two or more nonempty elements are detected, then sequentially detect for at least one nonempty element, and then identify the parsed file as a nonempty file based on the sequential detection.

19. The device of claim 18, further comprising a computer-readable non-transitory medium storing a direct submit utility module adapted to:
- if no nonempty elements are detected within the file, identify the file as an empty file; and
- if the file is identified as an empty file, not transmit the file to an output image/rendering device.

20. The device of claim 18, further comprising a computer-readable non-transitory medium storing a direct submit utility module adapted to:
- if the file is identified as an empty file, detect the presence of control information; and
- if at least one control information is detected, transmit the file to the output imaging/rendering device.

21. The device of claim 18, further comprising a computer-readable non transitory medium storing an empty object detection module adapted to:
- detect for nonempty indicator locations, wherein an empty file is identified if no nonempty indicator locations are detected; and
- if one or more nonempty indicator locations are detected, sequentially detect for at least one nonempty element associated with at least one of the one or more nonempty indicator locations.

22. A system comprising:
- a first device adapted to detect empty objects, the first device comprising:
  - an empty object detection module adapted to:
    - detect for at least one nonempty element from a parsed portion of a file, the nonempty elements adapted to indicate that the file is nonempty; and
    - if two or more nonempty elements are detected, then sequentially detect for at least one nonempty element, and then identify the parsed file as a nonempty file based on the sequential detection; and
  - a direct submit utility module adapted to:
    - transmit the file, if the file is identified as nonempty, to an output image/rendering device; and
- the output image/rendering device operably coupled to the first device, the output device adapted to:
  - receive the file for rendering.

* * * * *